Dec. 7, 1937.   C. H. JORGENSEN ET AL   2,101,369
THERMOSTATIC CONTROL FOR INTERNAL COMBUSTION ENGINES
Filed Oct. 23, 1933   6 Sheets-Sheet 1

Inventors.
Peter J. Jorgensen, deceased
Clarence H. Jorgensen, Administrator
By their Attys

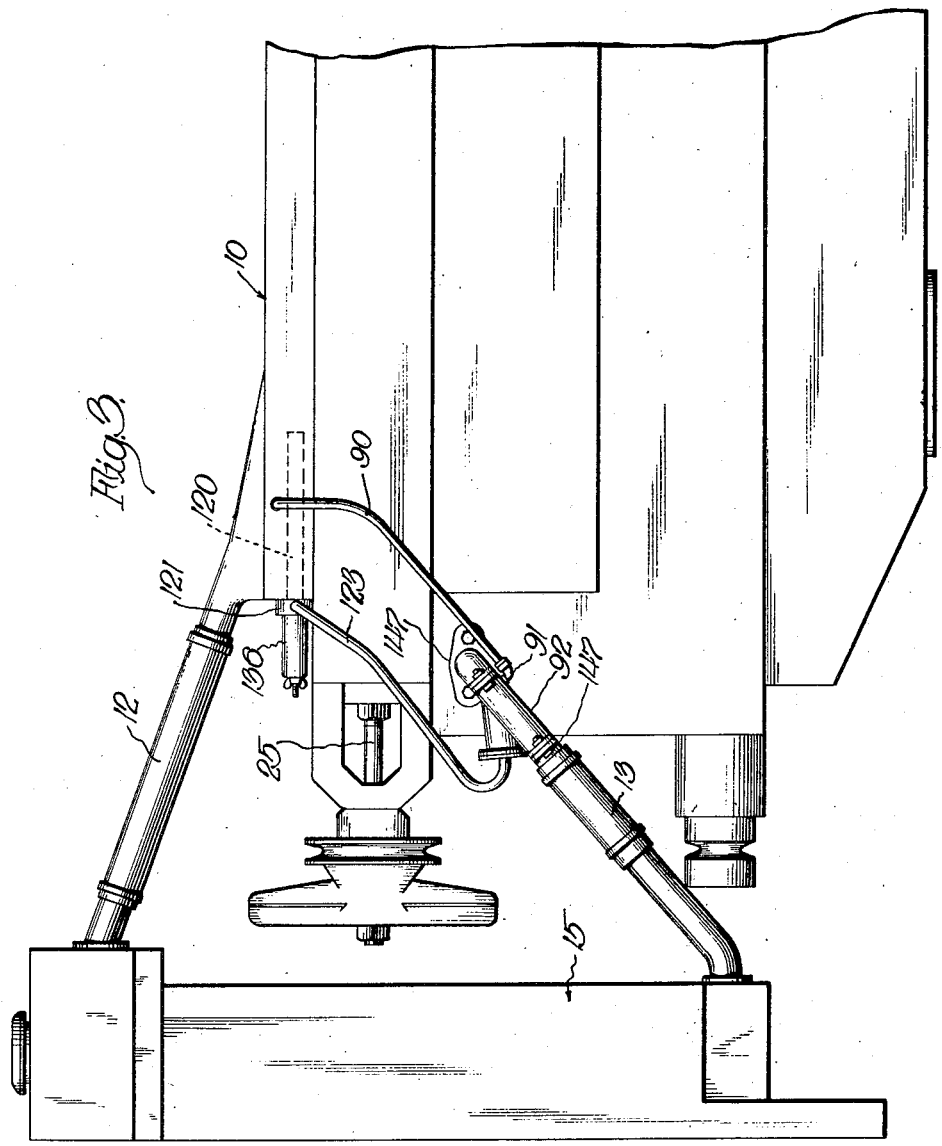

Dec. 7, 1937.   C. H. JORGENSEN ET AL   2,101,369
THERMOSTATIC CONTROL FOR INTERNAL COMBUSTION ENGINES
Filed Oct. 23, 1933   6 Sheets-Sheet 3
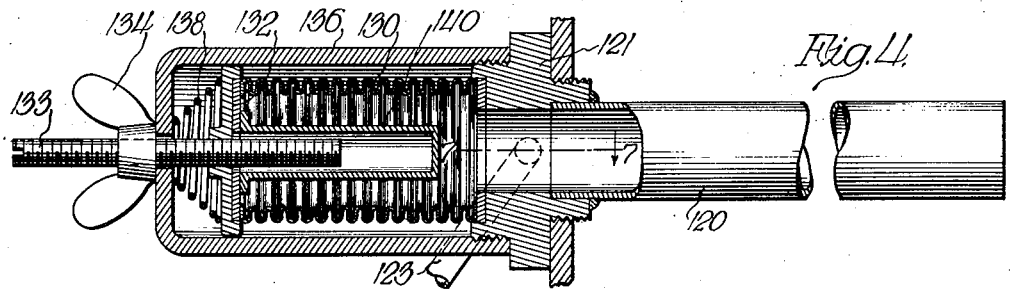
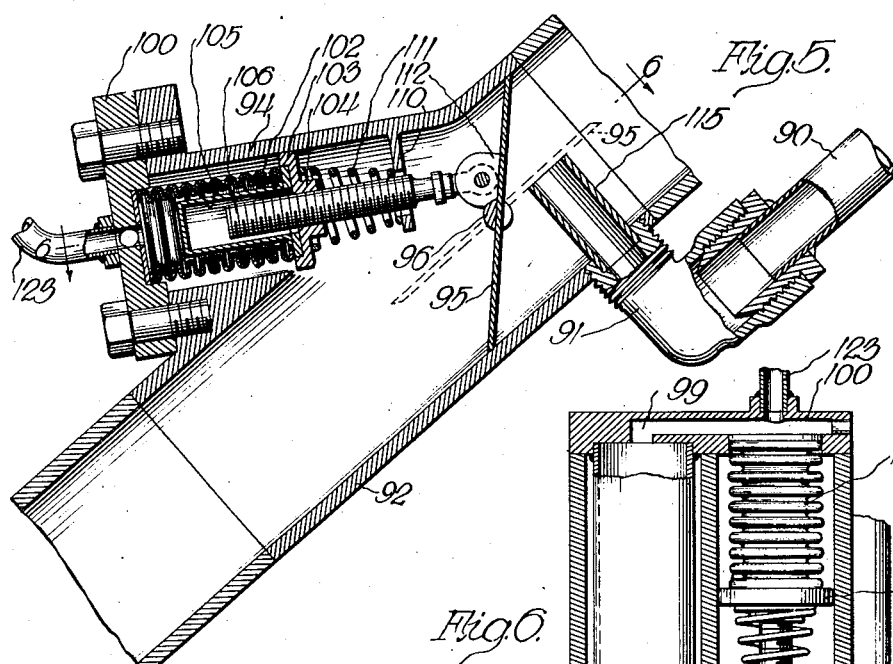
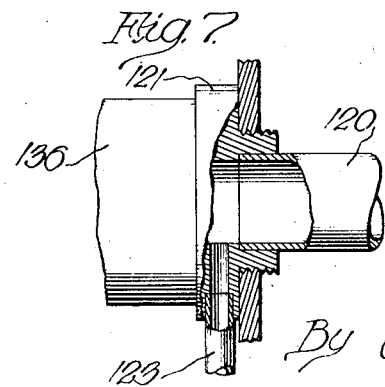

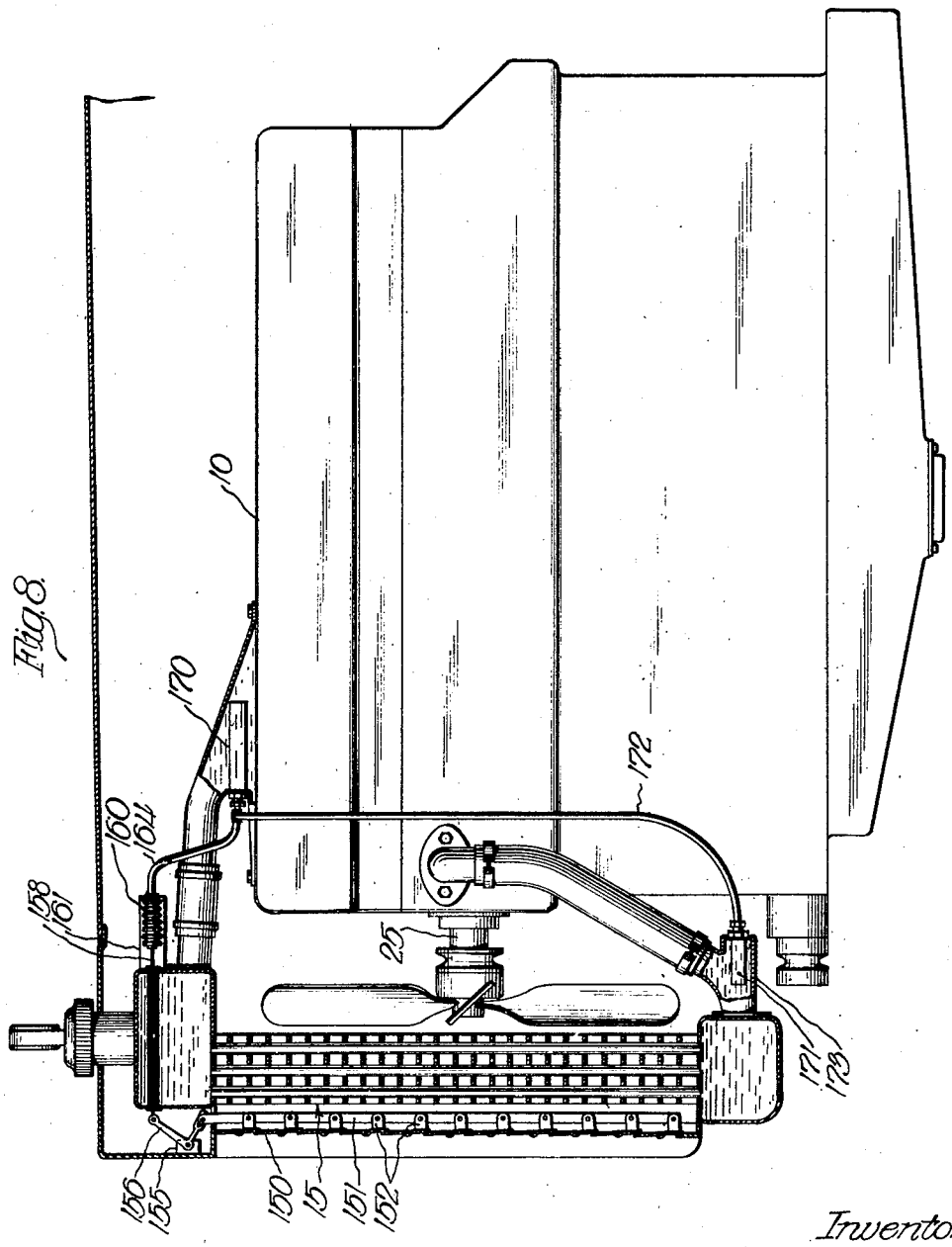

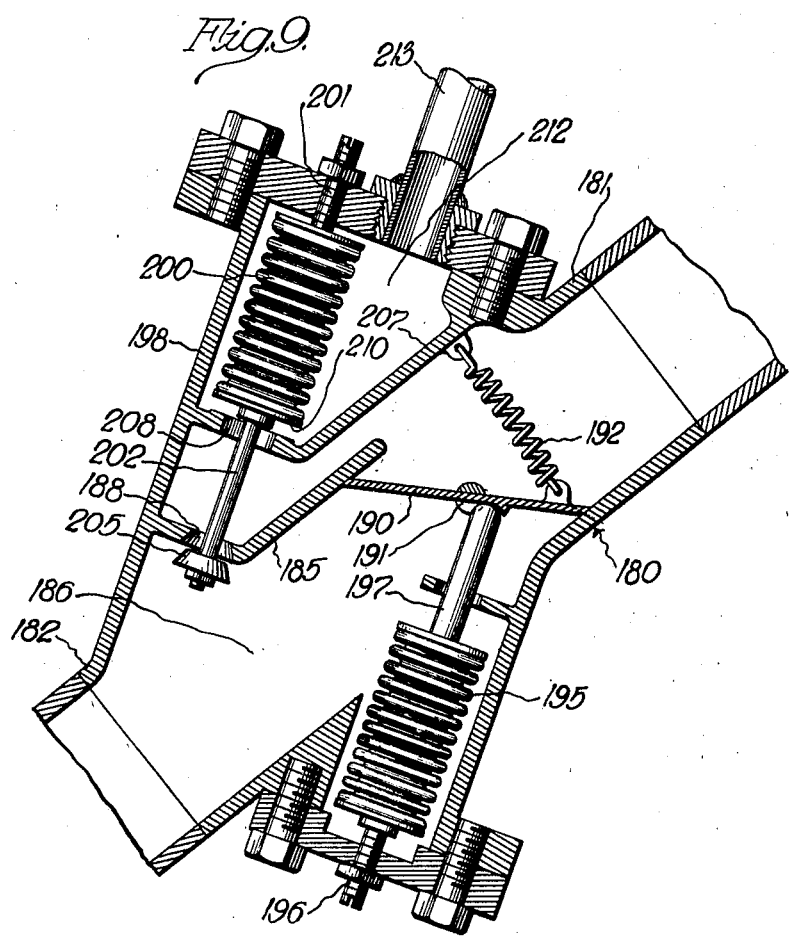

Dec. 7, 1937.  C. H. JORGENSEN ET AL  2,101,369
THERMOSTATIC CONTROL FOR INTERNAL COMBUSTION ENGINES
Filed Oct. 23, 1933  6 Sheets-Sheet 6
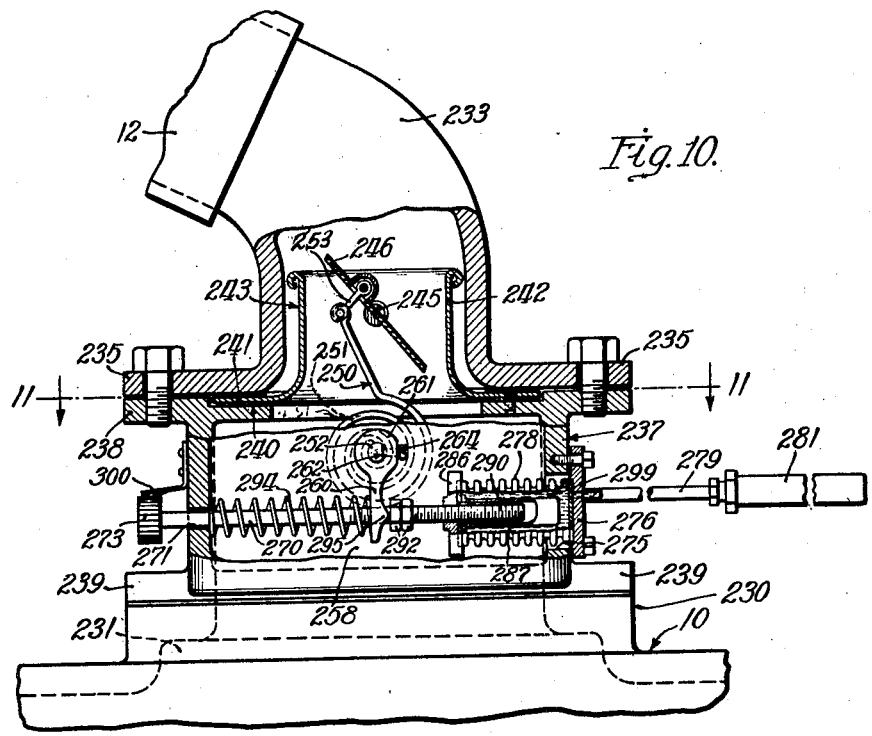

Patented Dec. 7, 1937

2,101,369

UNITED STATES PATENT OFFICE 2,101,369

THERMOSTATIC CONTROL FOR INTERNAL COMBUSTION ENGINES

Clarence H. Jorgensen, Elmhurst, Ill., and Peter J. Jorgensen, deceased, late of Elmhurst, Ill., by Clarence H. Jorgensen, administrator, Elmhurst, Ill.

Application October 23, 1933, Serial No. 694,814

47 Claims. (Cl. 123—178)

The present invention relates generally to temperature responsive control means and is particularly concerned with the provision of a new and improved means and method of controlling a cooling system for internal combustion engines or the like in accordance with the temperature at two spaced points in the system.

More specifically, the present invention concerns itself with a fluid system which embodies a flow of fluid or other medium and which includes means modifying the fluid or the flow or some other characteristic thereof in connection with the control means operative to adjust, control, or otherwise affect the functioning of such modifying means in accordance with corresponding changes in the fluid at two or more different points therein whereby, such modifying means being under the cumulative control of two separate means in the system, whereby a more sensitive and better control is had. Usually it may be preferable to provide these separate control units spaced apart so as to embrace one of the modifying means which, in operation affects some characteristic of the fluid moving in the system. This arrangement is, however, not necessary, the only essential being that the characteristic of the fluid, to which the control units are sensitive, is different at one point in the system where one of the units is disposed than at another point where the other control unit is placed. Of course, more than two control units may be utilized if desired.

The present invention also contemplates, in generic form, the provision of control means for a fluid circuit or conduit, either closed or open and which includes or is associated with two separate means operative to modify the fluid flowing in or through the system, which embodies means sensitive to or controlled by the cumulative or combined effects of both of said modifying means.

With the above mentioned generic objects and features in mind, the present invention is preferably embodied in a thermostatic control for internal combustion engines, although the principles of the present invention are equally applicable to other apparatus. It will be recognized, of course, that the present-day type of internal combustion engines necessarily includes some form of means for controlling the temperature of the engine in operation. Generally internal combustion engines are cooled by the circulation, either by thermo-syphon means or pump means, of a cooling fluid in thermal contact with the cylinder walls of the engine, together with means for extracting the heat from the fluid before returning the same to the engine.

Internal combustion engines, particularly those used to propel automotive vehicles and the like, are operated under widely varying conditions, particularly as regards temperature. Where a radiator or similar means is used as the cooling means for the cooling system it is desirable to provide some means for adjusting the effectiveness of the radiator, either by controlling the amount of flow of the cooling medium therethrough or by varying some characteristic of the radiator or perhaps both.

In any successful cooling system for automobile motors, and particularly, in successful control means therefor, there are a number of factors which must be considered. In the first place, where liquid is used as the cooling medium and is circulated around the cylinders of the motor, the temperature of the liquid should not exceed its boiling point. On the other hand, the temperature of the motor should be quite high in order to realize as much power and economy from the fuel as possible. Further, air temperatures vary widely, sub-zero temperatures being quite common in many localities during the winter months and temperature above 100° being equally common in many localities during the summer months. In addition to these three factors just mentioned it may also be pointed out that the thermal characteristics of the cooling medium may vary. For example, it is well recognized that many anti-freeze compounds are not as efficient as water, the commonly employed cooling medium, as a means for absorbing the heat from the motor and dissipating the same to the atmosphere.

From the factors just mentioned it will first be observed that the permissible range of temperatures of the heated cooling medium as it flows from the motor is quite small, as compared with the range of temperature at which the cooling medium may emerge from the radiator after passing therethrough. For example, if the cooling medium employed is a fluid having a low factor of conductivity, that is, one which does not absorb or give up its heat readily, it is desirable, in order to maintain the operating temperature of the motor at some desirable constant value, to have this fluid enter the water jacket of the motor at somewhat lower temperature than would be necessary if the fluid employed had a greater factor of conductivity. Therefore, the present invention is concerned with the provision of means for varying the effectiveness of the radiator to accommodate various operating conditions.

There are various means by which the efficiency or effectiveness of the radiator or other cooling means may be adjusted. One means which the present invention contemplates is adjusting the volume of flow, that is, diverting more or less of the flow of cooling medium through the radiator in accordance with the need for reducing the temperature of the cooling medium. Another means commonly employed in this connection takes the form of shutters by which the flow of air through the radiator may be adjusted. Whatever means may be employed to control or adjust the effectiveness of the radiator or other cooling means, it is very desirable to control the operation of such means in accordance with the factors mentioned above. To this end, the present invention contemplates placing such means under the control of, first, the temperature of the cooling medium as it emerges from the motor, which forms heating means for the cooling medium or fluid, and, second, under the control of the temperature of the cooling medium as it emerges from the radiator, which forms the cooling means for the fluid conduit system. By thus placing the effectiveness of the system under the control of these two characteristics, an extremely sensitive apparatus is produced and one which secures more or less ideal adjustment for all of the various conditions under which the motor may operate.

In addition, the present invention also contemplates arranging the sensitive units so that one may exert a somewhat greater controlling effect than the other. This sensitive unit is preferably disposed to be responsive to the temperature of the cooling medium emerging from the motor. The purpose of this arrangement is to place the unit having the greater sensitivity at the point where the permissible temperature variation is the smaller. The other sensitive unit can then be placed to be responsive to the temperatures where a greater permissible variation is allowed.

The practical effect of this arrangement is extremely important. In the first place, when the motor is initially placed in operation and the temperature thereof rapidly rises the extra-sensitive unit becomes active the moment this rapidly rising temperature reaches or passes a certain point and acts rapidly enough to prevent the motor from over-heating, this unit also acting more or less independently of the temperature to which the other sensitive unit may be subjected. By arranging this extra-sensitive unit to initiate the operation of the cooling system the latter may then be rendered active at the moment the temperature of the motor has passed the previously determined desirable minimum. In the second place, with this arrangement the second temperature responsive unit does not become active to any great extent until after the cooling system is initially placed in operation and has reached a certain temperature, but thereafter this second sensitive unit then performs the major portion of the operation of controlling the effectiveness of the cooling system so that the latter is adjusted to the needs of the motor, that is, according to the heat developed. Normally, therefore, the temperature of the motor is held more or less at a substantially constant value under most conditions. Thus, while the control of the cooling system is had at all times according to the cumulative effect of temperature changes at the two sensitive units it is nevertheless true that during one period of operation the major portion of the control is performed by one of the sensitive units while during another period of operation the major portion of the control is effected by the other of the sensitive units, each unit operating to effect the control in a manner best adapted for that particular period. It is also true that a further period of operation may occur, as when the temperature of the motor and the entire cooling system becomes quite high, that the control is even more positively effected by both of said units acting simultaneously in their full capacity. This is also true when the change-over or shift of control from one unit to the other occurs.

As mentioned above, shutters may be provided to cooperate with the radiator, or one or more shiftable members, such as valves or the like, may be associated with the various conduits, and it is to be understood that the present invention contemplates all of these means or the equivalent thereof. Where more than one valve is provided it is possible to dispose one of the sensitive units to control one of the valves with the other sensitive unit disposed to control the second valve, but in such situations it is nevertheless true that the two valves, considered as a whole, constitute valve means controlled in accordance with the temperatures at two spaced points in the system. Where only one valve member is provided the required proportioning of the control may be effected by varying the sensitiveness of the temperature responsive units, and where more than one valve is provided the required proportioning may be secured by arranging the various valves to control conduits of various sizes or by varying the sensitiveness of the thermal or temperature responsive units, or both.

In connection with thermostatic controls for the cooling systems of internal combustion engines and the like the present invention contemplates a further improvement which is of particular importance when employed with automobile motors and the like. The majority of the automobiles in use today utilize some form of centrifugal pump or the like for effecting the required circulation of the cooling medium through the water jacket of the motor and the associated radiator. During normal operation a relatively small flow of cooling medium will suffice unless temperature conditions are excessive. Where automobiles are equipped with thermostatically controlled valves, such valves will normally be disposed, therefore, in a position which somewhat closely approaches their closed position. Now when an automobile which has been operated for a sufficient length of time to become heated up to its normal operating temperature and when such automobile is brought to a standstill for a short length of time, as may occur in traffic controlled by signal lights, the motor drops to idling speed. In this case the circulating pump is driven at a rate which is so low that the effect of the pump is practically nil. The residual heat of the motor therefore immediately occasions a practically instantaneous rise in temperature of the cooling liquid in the water jacket, this effect being known as spilling over and is augmented by the fact that during idling speed the circulating pump is producing practically no flow whatsoever, whereas during normal operation of the motor the pump does develop sufficient speed to secure the required circulation with the thermostatic valve partly closed. Under some conditions steam pockets may be formed in the upper portions of the water jacket which tends to forcibly eject the water in the upper connections. The rise in temperature is further augmented by the tendency of all the hot water in the system to rise to the top and the cool water to drop to the lower portions of the radiator. This spilling over, as mentioned, produces an excessive and practically instantaneous rise of temperature of the cooling medium and since the circulating pump is not producing any material circulation the only means for keeping down the temperature due to this residual heat is the thermo-syphon effect. But in situations where the thermostatic valve is partly closed during normal operation of the automobile there is some time lag in the movement of the thermal element, so that the latter will not cause the thermostatic valve to open wide as rapid as the temperature rises, due to the spilling over effect just mentioned. Therefore, in automobiles employing thermostatic valves, the tendency sometimes occurs to build up a considerable pressure before the ordinary thermostatic valve can be opened wide enough to provide for a thermo-syphon flow. This is, of course, objectionable, and the present invention contemplates the provision of means for immediately opening the thermostatic valve, regardless of the temperature at which the thermal controlled units operate, so as to obviate as much as possible the objectionable feature of the rise of temperature of the cooling medium due to the residual heat of the motor when the same drops to idling speed after a period of operation.

Briefly, the present invention contemplates providing a thermostatically controlled valve, such as those referred to above and controlled by the means mentioned above, which is so constructed and arranged as to tend to close during the operation of the pump but which is biased to open immediately the pressure due to the operation of the pump ceases. For this purpose a small spring, weight or the equivalent may be utilized and is operative immediately the motor drops to idling speed to practically instantaneously open the thermostatic valve, irrespective of the position of the thermostatic control means therefor. This feature may be included in any of the thermostatic controls mentioned above.

While there are outlined above some of the general features of the present invention, many other objects and advantages of the present invention will be apparent to those skilled in the art after a consideration of the following detailed description of the preferred structural embodiments, taken in conjunction with the accompanying drawings, in which:

Figure 3 is a vertical elevation similar to Figure 1 but showing a modified form of thermostatic control embodying the same principles as the form shown in Figure 1;

Figure 4 is an enlarged detail, partly in section and partly in elevation, showing the upper thermostatic unit and an adjustment means therefor;

Figure 5 is a cross section taken through the control valve for the modification illustrated in Figure 3;

Figure 6 is a section taken along the line 6—6 of Figure 5 and shows the temperature responsive means disposed in the lower radiator connection and responsive to the temperature of the fluid in the lower part of the radiator;

Figure 7 is a detail view taken along the line 7—7 of Figure 4;

Figure 8 is a third modification illustrating the application of the principles of the present invention as embodied in a construction including shutters for the radiator;

Figure 9 is a fourth modification and illustrates the present invention as embodied in a construction in which all of the essential mechanism is disposed in one compact unit in the lower radiator connection;

Figure 10 is a section taken through a fifth modification and discloses the use of one thermal element in the form of a bi-metallic spring, both thermal elements being mounted in a unit adjacent the upper radiator connection; and Figure 11 is a section taken along the line 11—11 of Figure 10.

Figure 1:
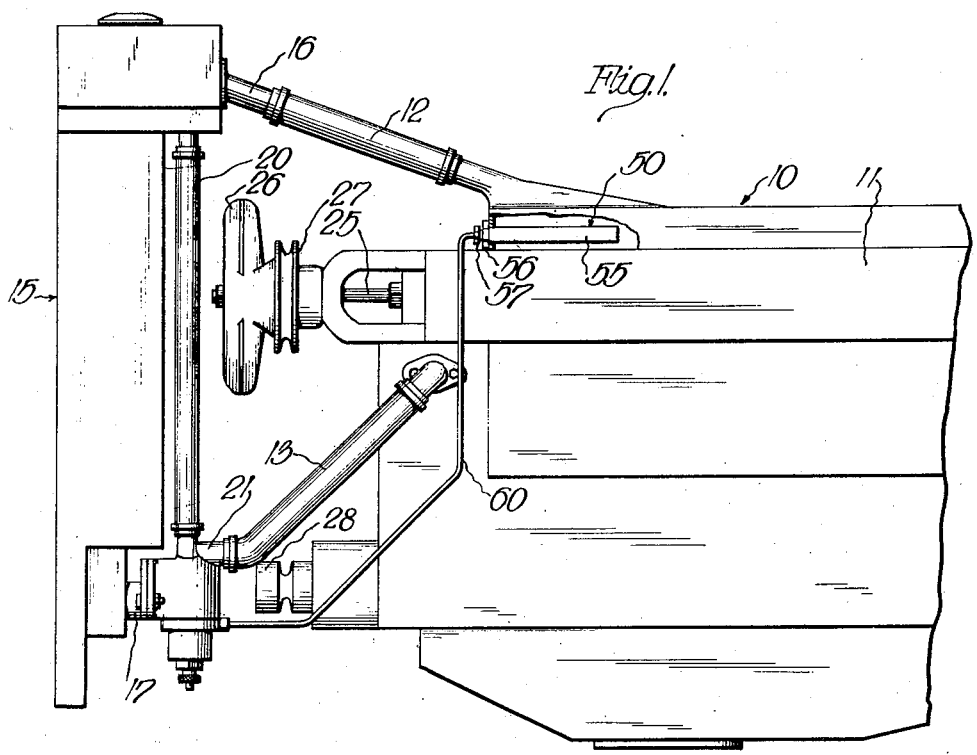
Figure 1 is a vertical elevation showing the motor and associated radiator of an automobile in which the principles of the present invention have been embodied.
Figure 2:
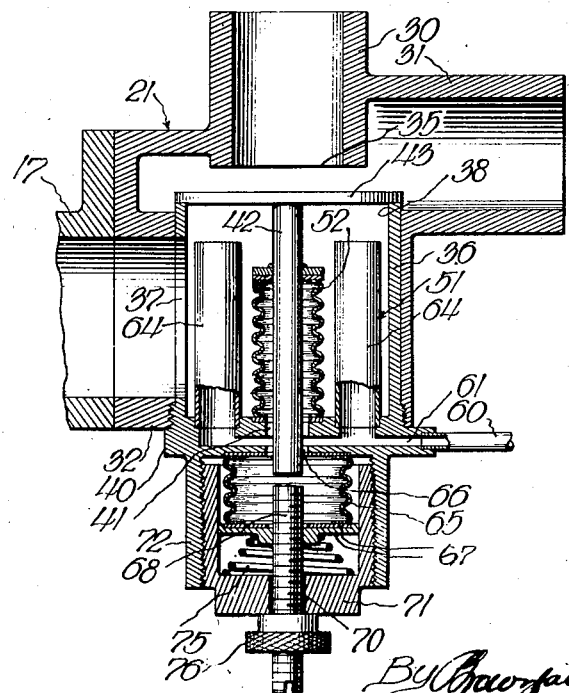
Figure 2 is an enlarged vertical section taken through the control valve housing and associated parts which are shown in Figure 1 at the lower part of the radiator.

Referring now to the drawings, and particularly to Figures 1 and 2, the reference numeral 10 indicates in its entirety a motor of an automobile. The motor 10 is an internal combustion engine of the conventional water cooled type and has a water jacket 11 and upper and lower hose connections 12 and 13, respectively. A radiator 15 communicates at its upper and lower portions with the upper and lower hose connections by means of connections 16 and 17, respectively. A by-pass 20 is provided which communicates at its upper end with the radiator and the connection 16 and at its lower end with the housing or body member 21 of the thermostatic valve, the details of which will be described later. The by-pass 20 serves to shunt a flow of cooling fluid around the radiator under conditions where the full cooling capacity of the radiator is not needed. The valve housing 21 communicates with the lower radiator connection 17, as will be clear from Figure 1.

From the above description it will be apparent that the connections 12 and 13, the radiator 15 and the by-pass 20 form conduit means which direct a flow of fluid into thermal contact with the cylinder walls of the motor 10. The latter, therefore, constitutes a source of heat which raises the temperature of the cooling medium contained in the system while the radiator 15 forms a means for cooling the contained fluid. The motor 10 is usually provided with a pump disposed in the upper portion of the cylinder head and driven from the shaft 25 which carries the cooling fan 26 provided for drawing air through the radiator and with which is incorporated a pulley 27 adapted to be driven by a belt or the like (not shown) from a second pulley 28 driven directly from the motor. The pump, represented by the shaft 25, thus causes a forced circulation of the cooling medium throughout the conduit means just referred to. In its more generic sense, the motor constitutes or represents any form of heating means which is arranged in thermal relation with respect to an associated conduit means, and the radiator 15 represents any form of cooling means which is also arranged in thermal relation with the conduit means referred to. The effect, therefore, of the heating means, namely, the motor 10, is to raise the temperature of the circulating fluid in the system while the effect of the cooling means, namely, the radiator 15, is to reduce the temperature of said circulating medium.

While the illustrated automobile cooling system forms, as just mentioned, a fluid conduit system in which is incorporated both heating means and cooling means in thermal relation therewith, such a system constitutes what we term a "closed system", that is, one in which the desired functions are secured without the constant addition of any material to the system. It will be apparent, of course, that generically the present invention is not necessarily limited to such a closed system in that it would be possible to provide, in systems employing a source of heat and a cooling means and a conduit system thermally associated therewith, a system or apparatus in which the fluid circulating through the system does not return after completing its circuit but is discharged, the circulation being maintained by a continual addition of fresh medium thereto. More specifically, such a system as this is employed in air cooled motors, the air thus constituting the circulating medium and, in addition, inherently forms a part of the cooling means in connection with the various structures associated therewith to direct the flow of the air.

The present invention, as mentioned above, is principally concerned with the provision of means and method for controlling circulation of the fluid throughout such a system or systems as just referred to. In the structural embodiment illustrated in Figures 1 and 2 where a closed water cooling system is shown, the preferred form of the present invention includes valve means operative to divert more or less of the flow of cooling fluid away from the radiator 15 so that the effectiveness of the cooling means is controlled, the flow thus diverted being directed through the by-pass 20.

The structure of the valve means is best illustrated in Figure 2. The housing 21 includes an extension 30 providing for the connection with the by-pass 20, a second extension 31 adapted to receive the lower radiator connection 13 and a ported end 32 adapted to be connected in any manner desired with the lower radiator connection 17. The extension 30 terminates in the interior of the housing 21 in a valve port 35, and communicating with the ported end 32 is a vertically disposed sleeve member 36 having one or more openings 37 and terminating at its upper end in a second valve port 38. The sleeve member 36 is provided at its lower end with a flange 40 adapted to be threaded into the valve body 21.

The flange or head 40 of the sleeve member 36 is provided with a central aperture 41 to receive the stem 42 of a valve closure member 43 movably disposed between the valve ports 35 and 38. In its lower position, that illustrated in Figure 2, the valve 43 closes the port 38 and in its upper position the valve 43 closes the upper port 35. The valve port 35 comprises the inlet from the by-pass 20 while the valve port 38 comprises the inlet from the radiator connection 17. Both of these valve ports are adapted to open into communication with the connection 31 which, in turn, connects with the lower radiator hose connection 13.

The valve 43 is shiftable between its lower and upper positions to control the flow of cooling medium through the conduit means which, as mentioned above, comprises the upper and lower radiator connections, the by-pass 20, and the radiator itself. If the valve 43 is in its lowest position the valve port 38 is closed and when the pump 25 is operated the fluid will be circulated though the upper connection 12, the by-pass 20, and back through the lower connection 13 to the intake of the pump. When the valve 33 is in its upper position the by-pass valve port 35 is closed and the water is drawn by the pump 25 from the lower part of the radiator through the connection 17 and the connections 31 and 13. In its intermediate positions quantities of the cooling fluid are drawn both from the radiator 15 and the by-pass 20 and, as is obvious, the closer the valve 43 approaches the inlet valve port 35 the less will be the amount of cooling medium diverted or shunted around the radiator 15 and the greater will be the effect of the radiator 15 in lowering the temperature of the cooling medium circulated through the conduit means in thermal association with the motor.

The position of the valve 43 is controlled in accordance with the temperature of the circulating fluid. In order to secure the best operation the valve 43 is placed under the control of thermal units disposed at spaced apart points in the conduit means so as to be responsive to the temperatures of the circulating fluid at two points. These points are chosen so as to secure the best and most accurate control of the cooling system, and the control means for the system will now be described in detail.

The control means comprises an upper liquid container or bomb 50 in the form of a long tubular member 55 closed at one end and fixedly secured at its other end in a flange 56 adapted to be threaded into a suitable opening formed in the upper portion of the water jacket. The flanged member 56 is provided with suitable means 57 affording a connection for a small pipe or conduit 60 which communicates at its upper end with the interior of the upper bomb 50. At its lower end the tubing 60 communicates with a bore 61 formed in the flanged head 40 of the sleeve member 36 in the valve housing 21 at the lower part of the radiator.

The lower bomb or liquid container 51 (Figure 2) preferably includes two or more tubular members 64 fixedly mounted in the flanged head 40 and having their interiors communicating with the bore 61. As shown in Figure 2 these liquid containers 64 are disposed in the sleeve member 36 and are subjected to the temperature of the water entering from the radiator through the opening 37 into the valve housing 21. The valve stem 42 is movable or shiftable within the sleeve member 36 and the bellows diaphragm or operator 52 is secured at its upper end to the valve stem 42 by soldering or the like and is secured at its lower end to the flanged head 40, the opening 41 being larger than the stem 42 so as to provide liquid communication between the interior of the bellows operator 52 and the port 61. The containers 64, the port 61, the tubing 60 and the container 55 form one continuous means for containing the thermostatic liquid. Preferably such liquid is one having a relatively large coefficient of expansion under changes of temperature and, assuming that this continuous liquid containing means is completely filled with the temperature responsive liquid, it will be apparent that a rise in the temperature of the upper liquid bomb will cause an increase in the total volume of the confined liquid, and this increase will be accommodated by the expansion of the bellows operator 52. The expansion of this member will, of course, raise the valve 43. Likewise if the liquid containers 64 are subjected to an increase in temperature the confined liquid will be expanded and the increase in volume will again expand the bellows 52 to raise the valve 43, and the same occurs if both upper and lower liquid bombs are subjected to an increase in temperature. It will also be apparent that if there should be an increase in temperature of one of the bombs and a decrease in the temperature of the other, then whether or not the valve 43 will be moved will depend upon several factors, the most important of which is the relative change in temperatures and the proportion between the volumes of liquid subjected to such changes. In this way it will be seen that the valve 43 is differentially responsive to changes of temperature at two points in the system, the upper and lower liquid bombs serving as and actually forming temperature responsive units disposed at the two spaced apart points mentioned.

In a system comprising liquid containing means entirely filled with liquid it is desirable to provide some form of relief in case either or both of the temperature responsive units are subjected to an abnormal increase in temperature, otherwise the force of the expansion of the excessively heated liquid would fracture the bellows operator 52 or some of the connections associated therewith. The relief we provide is best shown in Figure 2 and comprises an auxiliary bellows 65 communicating with an opening 66 with the port 61, and hence forming a continuation of the thermostatic liquid confining means. One end of the bellows is secured as by soldering or the like to the flanged head 40 while the other end is closed by means such as plates 67 with which a stem 68 is fixedly connected. The outer end of the stem 68 is slidably received in an opening 70 in a bushing 71 threaded into an extension 72 of the flanged member 40. A spring 75 is interposed between the bushing 71 and the plates 67 and is strong enough to withstand all normal expansive forces of the confined thermostatic liquid. However, should either of the liquid bombs be subjected to an abnormal increase in temperature the spring 75 will yield allowing the bellows 65 to expand before any damage can be done to the other parts. A lock nut 76 is provided on the threaded end of the stem 68 to prevent the spring 75 from entirely collapsing the bellows 65. Adjusting the nut 76 will adjust the position of the valve 43.

The inner end of the stem 68 is extended for some distance into the bellows 65 so as to occupy a position close to the outermost end of the valve stem 42. This construction provides means for forcibly opening the valve 43, as by backing off the lock nut 76 and with a suitable tool forcing the stem 68 in against the stem 42 to manually raise the valve 43 off its seat. This may be quite desirable in case the valve 43 should for any reason become struck to the radiator inlet valve port 38, in which case the motor 10 might become quickly overheated due to the fact that no cooling fluid would be diverted through the radiator but all would be shunted around the same. This emergency is therefore taken care of by thus providing means for manually freeing the valve 43 in such cases.

As mentioned above, there are a number of factors affecting the control which are important and which must be taken care of if a positive and accurate control of the cooling system of automobile motors and the like is to be effected. By providing a temperature responsive unit adjacent the upper radiator connection to provide means responsive to the operating temperature of the motor, that is, the upper thermal unit 50 is responsive to the temperature of the cooling medium as it leaves the motor. Next, by providing the lower temperature responsive unit adjacent the lower radiator connections, the second unit is responsive to the temperature of the cooling medium as it emerges from the radiator. The temperature of the liquid leaving the radiator is responsive to two of the factors mentioned, namely, the effectiveness of the radiator as a cooling device and the temperature of the air which by virtue of the radiator removes heat from the circulating fluid. According to the invention, therefore, there is provided means which is responsive to the temperature of the motor so that, just as soon as the temperature during the warming-up reaches the desired value, the means controlling the circulation is immediately adjusted to divert a portion of the circulating medium through the cooling means, namely, the radiator. This particular step is especially important. As soon as the valve 43 is opened by virtue of the expansion of the liquid in the upper bomb 50 some of the liquid is drawn by the pump 25 from the radiator 15. This establishes a circulation through the radiator so that the temperature of the liquid at the bottom of the radiator, that is, the temperature of the cooling medium after it has been heated by the passage through the water jacket of the motor and after it has been cooled by the operation of the radiator, affects the lower liquid bombs 64. If the temperature of the liquid emerging from the radiator is quite high the liquid in the bombs 64 will be expanded and this will occasion a further increase in the opening of the valve 43, which in turn causes a greater diversion of the cooling medium through the radiator. Therefore, just as soon as the desired temperature after the warming-up period has occurred is reached, during which time the position of the control valve 43 was governed by the temperature of the cooling medium coming from the motor, the control is shifted to the lower thermostatic units so that the valve 43 will then be principally governed by the temperature of the liquid emerging from the radiator. This does not mean that control of the valve 43 is taken away from the upper thermal unit, but it will be apparent that the major portion of the control will be effected by the lower unit because the effect of the latter is to position the valve 43 so that the temperature of the liquid entering the water jacket of the motor will be the same, and if this temperature is kept constant the temperature of the liquid leaving the motor will also be constant as long as the power output of the motor does not vary. If the motor becomes heated the temperature of the water entering the radiator will be higher and, assuming a constant efficiency of the radiator under given conditions, then the temperature of the liquid passing the thermostatic units 64 will be higher and this will occasion a further opening of the valve 43. This immediately causes a greater diversion of the cooling medium to the radiator so that the efficiency or the effectiveness thereof as a part of the cooling system will be increased, with the result that the temperature of the water or medium entering the motor will be kept to a desirable value, which means that although a temporary increase in the power output of the motor will raise the temperature of the upper bomb 50 a slight amount the decrease in temperature of the liquid entering the motor will balance the increase in temperature of the latter so that, in the end, it remains substantially the same and under the control of the lower thermal unit. Naturally, of course, if the motor temperature rises the temperature in the upper bomb rises so that the confined thermostatic liquid will be expanded to raise the valve 43 further regardless of the temperature at the lower bomb.

Briefly, therefore, there is provided a valve or an equivalent control means which is responsive to two thermostatic units, each of which is effective to maintain the required or desired conditions. If the temperature at either point remains the same then the control of the control means is effected wholly by the other, and if the temperature at both points changes then the control is effected by both of said units acting differentially or cumulatively.

Remembering that the control valve 43 during the initial warming-up is controlled practically entirely by the upper thermostatic unit, regardless of the outside temperature and remembering, further, that the desirable operating temperature of an internal combustion engine is relatively quite high, it will be immediately apparent that the control effected by the upper thermostatic unit must be positive, accurate and rapid. Generally, it is desirable to bring the temperature of the motor up to about 150 or 160 degrees before any circulation through the radiator is to be established, yet in order to prevent boiling out of anti-freeze compounds or to prevent the excessive rise of temperature at any time, the responsiveness and accurateness of the upper thermal unit must be assured. If there should occur any delay in opening the valve after the temperature of 150 or 160 degrees has been reached the temperature of the motor may rise so rapidly as to damage the motor before the control valve can be shifted to bring the cooling radiator into operation. In order to effect, for this initial warming-up period, the control of the valve by the upper unit only, a second factor must be considered, and that is the widely varying differences of outside temperatures at which the motor may be called upon to operate. For example, during winter months the outside temperature may be as low as 0° F. or below while during the summer months the temperature may be as high as 100° F. Yet under these various conditions it is nevertheless important that the control valve be opened without delay just as soon as the temperature of the motor, or in other words, the temperature of the cooling medium leaving the motor, reaches 150 or 160 degrees. The present invention contemplates providing for these conditions by having the volumetric capacity of the upper liquid container 55 approximately ten times as great as the volumetric capacity of the lower liquid containing means 64. The effect of this arrangement is to render the control valve ten times as responsive, approximately, to the temperature of the liquid at the upper radiator connection than it is to the temperature at the bottom of the radiator. Such arrangement renders the system practically independent of outside temperatures as far as governing the opening of the control valve in response to the temperature of the motor during the warming-up period.

When starting out, of course, the temperature at the bottom of the radiator is substantially the same as the outside temperature. If, for example, 150° motor temperature and 50° air temperature are the desired points at which it is desired the control valve shall begin to open, then a temperature variation of 50° outside temperature, say from 25° to 75° F., which range will include the majority of driving conditions, the actual temperature at which the control valve will open will only vary from the desired 150° by 2½° from either side thereof. This extra sensitiveness of the upper thermal unit does not, as a practical proposition, prevent the shifting of the control to the lower thermal unit after operating conditions have been established, because the effect of the lower thermal unit is to maintain the temperature of the motor substantially constant near the desired 150°, and of course, as long as the temperature at the upper unit is constant the volume of the confined liquid in the container 55 is constant, hence the position of the valve 43 is varied in very close proportion to the changes of temperature of the cooling medium leaving the radiator. However, the upper thermal unit stands ready at all times, and with great sensitiveness, to open or close the valve 43 should for any reason the temperature of the cooling medium leaving the motor vary. In this event, therefore, the valve passes under the control of both thermal units, but in the sense that the lower unit actually performs under operative conditions the major portion of the positioning of the valve the latter unit is the more effective. Of course, as mentioned above, during the initial or warming-up period, practically the entire control is effected by the upper thermal unit because the temperature at the bottom of the radiator does not begin to vary until the valve 43 is opened so as to divert more or less of the cooling medium to the radiator.

In Figures 3 to 7, inclusive, there is shown a slightly modified form of thermostatic control means for governing the flow of the fluid through the cooling conduit system. Fundamentally, however, the principles employed in the modification shown in Figures 1 and 2 are utilized in practically the same way in the modification shown in Figures 3 to 7. Referring now to Figure 3, the by-pass is indicated by the reference numeral 90 and is connected at its upper end with the cylinder head or with the water jacket and at its lower end is connected with a fitting 91 opening into a casing 92 forming a valve housing corresponding to the valve housing 21 shown in Figure 2. A valve 95 is pivotally supported within the casing 92 by means of pivot pins 96 or the equivalent, and the valve 95 is shiftable about its pivotal axis from a transverse or crosswise position in the housing or casing 92 to a longitudinal position. In the latter position the valve is open while in the transverse position the valve 95 serves to close off the communication between the radiator and the intake of the pump.

The valve housing 92 is disposed between the lower radiator hose connection 13 and the cylinder block and is provided with an angularly disposed branch 94 serving as a casing for the lower thermal element and the bellows operator for the valve 92. As best shown in Figures 5 and 6 the casing 94 includes a liquid container 98 having one end closed and the other in communication with a port 99 formed in a cap plate 100 adapted to be positioned over and to close one end of the casing 94. Mounted on the cap plate 100 is a bellows operator 102, comparable to the bellows operator 52 shown in Figure 2, and the interior of this operator is in open communication with the interior of the liquid container 98 through the bore or port 99. The opposite end of the bellows operator 102 is closed by plates 103 provided with a central boss 104 and an interior sleeve member 105 which receives the inner threaded end of a stem 106. A bracket 110 disposed on the casing 94 is provided with a suitable aperture accommodating the stem 106, and a spring 111 is biased between the bracket 110 and the plates 103. The spring is operative to maintain the stem or plunger 106 in retracted position. The stem is pivotally connected with the butterfly valve 95 by means of lugs 112 carried by the valve disc at a point spaced from the pivotal axis 95 thereof.

As best shown in Figure 5, the fitting 91 of the by-pass is provided with an interior extension 115 which extends to a point adjacent the valve 95 and is so disposed relatively thereto that when the valve disc 95 is in its wide-open position the extension 115 is closed off. In thus closing off the by-pass the valve 95 functions, therefore, in practically the same way as the valve 43 described above.

The upper thermal unit of the modification illustrated in Figures 3 to 7 consists of an element quite similar to the liquid bomb 50 shown in Figure 1. A tubular member 120 having one end closed and the other end fixedly secured to a bushing 121 is threaded into the water space in the cylinder head adjacent the upper hose connection and is in communication with a tube or pipe 123. The lower end of the pipe 123 is fixed to the cap or plate 100 and communicates through a small opening therein with the interior of the bellows operator 102 and with the interior of the lower liquid bomb 98 by virtue of the bore or port 99. Thus, like the modification shown in Figure 1, the two interconnected liquid bombs or containers and the associated bellows operator constitute means for containing a confined body of thermostatic liquid which expands under the influence of temperature variations. These liquid containers in the upper and lower positions are formed with rigid walls while the bellows walls are flexible, and hence any expansion of the liquid, due either to rise in temperature at either of the thermal units, is operative to expand the bellows and shift the control valve.

The means for adjusting the volumetric capacity of the thermal units and to provide for the relief of the latter in the event the motor overheats comprises the construction illustrated in Figure 4. It will be apparent that the construction employed in Figure 4 is quite similar to that shown in Figure 2. In Figure 4 an auxiliary bellows 130 is connected with the bushing 121 so as to dispose the interior thereof in communication with the interior of the upper liquid container 120. The end of the auxiliary bellows opposite the bushing 121 is closed by plates 132 having a stem 133 secured thereto. A thumb nut 134 is threaded onto the stem 133 and abuts against a surrounding casing or bushing 136 carried by the bushing 121. When excessive pressures are developed within the system the spring 138, biased between the outer end of the casing 136 and the plates 132, yields and provides for the necessary volumetric increase. The spring 138 tends to retain the thumb screw 134 in abutment against the end of the casing 136. A sleeve 140 is carried by the plates 132 and is enclosed within the interior of the auxiliary bellows 130 to accommodate the inner end of the stem 133.

Any suitable means may be provided for securing the lower unit 92 in place. Preferably, however, the casing 92 and the associated connections are provided with suitable lugs 145 and 146, see Figure 6, which are apertured to receive securing bolts 147.

The operation of the modification shown in Figures 3 to 7 is practically the same as the operation of the modification illustrated in Figures 1 and 2. The thermal units 98 and 120 are, either of them, effective to control the position of the butterfly valve 95 in accordance with the temperature at either the jacket outlet to the radiator or the lower radiator connection, or both. The volumetric capacity of the thermal unit 120 is approximately ten times as great as the capacity of the lower unit for the same reasons and with the same results as outlined above. Obviously, of course, such proportions may be widely varied due to different conditions.

During the time that the motor is initially warming-up the position of the valve 95 is controlled primarily by the temperature of the first thermal unit 120. Of course during this period the temperature at the lower part of the radiator connection does not vary, but after the motor has become initially warmed-up the valve 95 is slightly opened or cracked, whereupon a flow of cooling medium is established and whereupon the temperature at the lower part of the radiator changes and becomes approximately proportional to the cumulative effects of the heat produced by the motor and the cooling effect produced by the action of the atmospheric air on the radiator. During this stage the position of the valve 95 is, therefore, primarily controlled by the temperature of the water emerging from the lower part of the radiator since normally the temperature of the water flowing away from the motor remains substantially the same. However, by virtue of the upper thermal unit 120, whatever fluctuations there may be are imposed upon the control of the valve 95 effected by the lower thermal unit. During this changeover period both thermal units are active in control of the valve, and likewise after the motor has become thoroughly warmed-up and the liquid emerging from the radiator is quite warm, in which case the valve 95 is then approaching its wide open position in which the by-pass is closed up.

In the constructions described above the effectiveness of the radiator 15 as a cooling means for the conduit system was regulated by diverting more or less of the flow of fluid medium through the radiator proper. Figure 8 illustrates a slightly different form of means for varying or controlling the effectiveness of the cooling means, which, nevertheless employs essentially the same principles as those set forth above. In Figure 8 the radiator 15 is provided with a plurality of shutters 150 comprising a plurality of leaves pivotally connected to swing about horizontal axes and interconnected to be actuated together by a vertically extending link 151. The link 151 is connected to operate the shutter leaves by lug means 152. The upper portion or shell of the radiator carries a bracket 155 which pivotally supports a bell crank 156 or the equivalent having one arm provided with a pin and slot connection with the upper end of the connecting link 151 while the other arm is connected with a draw wire or operating rod 158. The latter member is operatively connected with an operating bellows 160 similar in construction and function to the two operating bellows 52 and 102 mentioned above. The opposite end of the operator 160 is anchored in any suitable manner, as by being connected to a supporting bracket 161. The bellows 160 is operated by hydrostatic pressure communicated thereto by a small pipe 164.

The thermal units 170 and 171 are provided and each unit is in communication with the tube 164 leading to the operator 160. The lower thermal unit 171 is connected therewith by means of a tube 172 and is disposed in the lower radiator connection 173 so as to be subjected to the temperature of the cooling medium in the lower part of the radiator. The upper thermal unit 170 is practically identical with the thermal units shown in Figure 1. For purposes of simplicity there has not been shown any adjusting means, such as the bellows 65 in Figure 2 or the bellows 130 in Figure 4, but it is to be understood that either of these features or the equivalent thereof may be associated with the thermal units 170 and 171.

These thermal units and the associated piping, together with bellows operator 160 form, as in the previous modifications, an interconnected liquid containing means. The upper thermal unit or liquid bomb 170 is subjected to the temperature of the water flowing from the water jacket of the motor 10 while the lower unit, as stated, is subject to the temperature of the liquid emerging from the radiator.

Following the principles outlined in detail above, the radiator shutters 150 are positioned in accordance with, first, the temperature of the cooling medium at the top of the motor, second, according to the combined effects of the temperatures at the top of the motor and at the bottom of the radiator, and third, according to the temperature of the water at the bottom of the radiator.

Figure 9 is an illustration of another modification of the present invention in which the principles outlined above are embodied. In Figure 9 two separate thermal elements or temperature responsive units are employed, and while these units are not structurally interconnected as in the modifications outlined and set forth above, in function, however, they act in a manner similar to the previously described modifications and secure practically all of the advantageous results. One advantage, however, of the modification of Figure 9 is that the device is arranged as a single compact unit and does not entail as many connections, hence is somewhat simpler and even less expensive to install. However, the elements may be interconnected by a tube or the like if desired.

In Figure 9 the reference numeral 180 represents the casing of the control unit. One end 181 of the casing or housing 180 is adapted to be connected to the water inlet of the motor, while the opposite end 182 is adapted to be connected with the lower radiator connection. The casing 180 includes a central wall structure 185 which includes a passage for the cooling medium from the radiator to the motor, said passage being indicated by the reference numeral 186. The central wall structure 185 is also provided with a valve port 188 which permits a relatively small flow of cooling medium from the radiator side of the casing to the motor side through suitable openings and passages for that purpose.

The main flow of cooling medium from the radiator to the motor is controlled by a butterfly valve 190 pivoted at 191 in the casing. A spring 192 is connected with the valve at one end and at its other end is anchored to a part of the casing. The spring 192 biases the valve 190 to open position. The pivot 191 for the valve 190 is not disposed exactly in the geometrical center of the main passage 186 but is disposed at one side thereof just sufficient to cause the valve 190 to close under the suction of the circulating pump and against the tension of the spring 192, for a purpose which will be made clear later.

The casing 180 has provision for receiving a thermal unit 195 of the expansible bellows type. One end of this unit is anchored to the casing, as at 196, while the other end has secured thereto an operating plunger 197 with its outermost end rounded and engageable with the valve 190 at a point slightly spaced from the pivot axis 191 thereof. The plunger or stem 197 is not otherwise connected with the valve 190 so that the spring 192 is capable of swinging the valve 190 to its open position regardless of the position of the plunger 197. However, under the influence of temperature changes and the consequent expansion of the element 195 the plunger is adapted to be moved into engagement with and to shift the valve 190 to open the same against the bearing friction of the pivots 191 and the suction of the circulating pump.

The casing 180 also includes a branch or extension 198 providing means to receive a second thermal element 200 having one end anchored, as at 201, to the casing and including a stem 202 at its other end to which is secured a second valve 205 in any desired manner. The valve 205 is adapted to control the flow of small quantities of fluid through the valve port 188. The casing 180 is also formed with a second wall 207 and a valve port 208 controlled by a valve closure 210 also carried by the stem 202 and shifted by the second thermal element 200. The wall 207, in connection with the branch or extension 198, forms a by-pass chamber 212 in which the element 200 is disposed and with which a by-pass conduit 213 communicates. The other end of the by-pass 213 connects with the water jacket of the motor in a manner similar to the connection between the upper end of the by-pass 90 and the water jacket of the motor shown in Figure 3.

The operation of the last described modification is substantially as follows: The thermal element 195 is responsive to the temperature of the water emerging from the radiator and the thermal element 200 is responsive to the water in the by-pass. During operation of the motor the circulating pump thereof creates a suction on its intake side, with which the end 181 of the casing 180 is connected, and assuming that the motor is cold the thermal element 200 will be contracted which will close the valve 205 and open the valve 210. The opening of the last named valve affords communication between the suction side of the circulating pump and the by-pass chamber 212, and therefore a small shunt flow will be caused to move from the water jacket down through the by-pass 213 and into the by-pass chamber 212, thence to the valve 208 and back to the inlet side of the pump. Since the by-pass 213 is relatively short the temperature of the water passing through the by-pass chamber 212 in which is disposed the thermal unit 200 will be a temperature practically the same as the temperature of the water at the jacket outlet to the radiator. The thermal unit 200 is therefore subjected to the temperature of the motor or the temperature of the cooling medium leaving the motor. The unit 200 is adjusted to be active in opening the valve 205 at approximately 150°, but not before, and just as soon as the small valve 205 is opened some of the cooling medium will be drawn from the radiator through the valve opening 188 and into the inlet side of the circulating pump. The valve 205 is not large but a sufficient circulation may be secured in this manner for cooling the motor for a considerable period especially during cool or cold weather.

The other thermal unit 195 is, as stated, responsive to the temperature of the water at the bottom of the radiator. Just as soon as the small circulation is established by the opening of the valve 205 the element 195 is shiftable in response to the temperature of the water emerging from the radiator. As long as the small circulation through the open valve 205 is sufficient to keep the temperature of the motor down, that is down to the desired 150° or thereabouts, the thermal element 195 will not be expanded sufficient to open the valve 190. However, should the temperature of the motor rise for any reason whatsoever the effect will be transmitted to the cooling medium which, in turn, will then emerge from the radiator at a somewhat higher temperature and will affect the thermal element 195 and the latter will then expand sufficiently to bring the plunger 197 into operative association with the valve 190 to swing the same, even against the suction of the circulating pump. Immediately the valve 190 is opened, of course, a much greater flow of circulating medium is established, and the thermal unit 195 will be effective to maintain the desired operating temperature of the motor by shifting the valve 190 in accordance with the temperature of the water emerging from the radiator.

It is important to note in this modification that during the initial or warming-up period all of the control is effected by the thermal element 200 and that this control is maintained during such times as the flow through the small valve 205 is sufficient to keep down the temperature of the motor. As the temperature rises there is a less amount of water shunted through the by-pass due to the action of the valve 210 in approaching its valve port 208 as the thermal element 200 expands. The element 200, therefore, retains control of the system until the valve 210 is entirely closed. Before this point is reached, however, the temperature of the water leaving the radiator is usually sufficient to cause the thermal element 195 to slightly open the valve 190. There is, therefore, at this stage a condition in which both thermal elements 195 and 200 are effective in shifting the associated valve means in controlling the operation of the system. During normal operations, as outlined above in connection with the modifications shown in Figures 1, 3, and 8, the temperature of the water leaving the radiator toward the motor remains substantially the same, so that, where in the previous modifications the major portion of the control during normal operation is effected by the element which is disposed in the lower radiator connection, in the modification shown in Figure 9 it may also be considered that the element 195 performs the major portion of the control, particularly after the valve 205 has been completely opened and the valve 210 has been completely closed because at this time there is no circulation of liquid through the by-pass 213. The element 200 is maintained, however, at substantially the temperature of the water leaving the motor for the reason that should the element 200 become cooled the valve 210 will be immediately opened a slight amount which will at once cause a flow of water from the water jacket directly through the by-pass 213 into the chamber 212 and into thermal relation with the element 200. In its essential features, therefore, the modification shown in Figure 9 is structurally and functionally comparable to the modifications shown in the previous figures.

Mention has been made above that the valve 190 is so arranged as to close under the suction of the circulating pump and to open under the tension of the spring 192, the operation of the thermal unit 195 acting to open the valve 191 even against the suction of the circulating pump, the spring 192 being operative to open the valve 191 when the pump is not operating, regardless of the position of the stem 197 of the thermal element 195. This particular construction is the means by which an important result is secured. After an automobile motor has been operated for some considerable period of time and the automobile brought to a stop with the motor dropping to idling speed, the suction of the circulating pump immediately drops to a relatively small amount and is not sufficient to cause any material circulation of the cooling medium.

It would be desirable, therefore, to have the control valve immediately opened just as soon as the operation of the circulating pump stops in order to establish thermo-syphon cooling, regardless of the position of the control valve which, under running conditions of the automobile, would be sufficient to keep the temperature down as long as the circulating pump operates. The modification illustrated in Figure 9 attains this desirable result by providing the valve 190 so that the same will open just as soon as the motor drops to idling speed. Since the tendency of the suction due to the circulating pump is to maintain the valve 190 closed, or to retain the same against the end of the plunger 197 in case the element 195 is extended, against the tension of the spring 192, immediately the suction drops the spring 192 acts to swing the valve 190 open, thus providing for a circulation in the system due to the thermo-syphon effect. However, the spring 192 is arranged not to swing the valve 190 to its exactly wide open position, since it is necessary that the valve be in such a position that the subsequent establishment of suction will act upon the valve to close the same. If, for example, the valve 190 were disposed substantially parallel to the flow, the establishment of suction would not close the valve. It is important to note that the valve 190 opens just as soon as the motor drops to idling speed and that it is not necessary to wait until any temperature responsive unit has its temperature raised. There is, therefore, no lag in the responsiveness of the control valve. It will be apparent that these features just referred to may be incorporated in a control valve in which a second thermal unit and the auxiliary or small valve are dispensed with.

Figures 10 and 11 disclose a construction embodying the principles of the present invention as set forth above, the modification shown in these figures being a construction in which one of the temperature responsive units is in the form of a bimetallic spring or the equivalent, while the other temperature responsive unit is in the form of a chamber containing an expansible liquid similar to the units described above. In the form shown in Figures 10 and 11, the control means is of a somewhat simplified nature and all of the component parts thereof are included within a casting or the like which is adapted to be placed at the top of the motor adjacent the upper radiator connection.

Referring now more particularly to Figures 10 and 11, the reference numeral 230 indicates a flanged portion of the cylinder head which is provided with an opening 231 leading to the water jacket space of the motor 10. A hose connection head 233, to which the lower end of the upper radiator hose connection 12 is adapted to be secured in any manner, is provided with laterally directed flanges 235 which may be connected with the flanged portion 230 of the cylinder head through the medium of an interposed spacer casting or member 237. The spacer member is provided with upper and lower flanges 238 and 239 as best shown in Figure 10, and the upper flanged portion carries a recess or groove 240 in which is seated the flange 241 of a tubular member 242 forming a part of a valve device indicated in its entirety by the reference numeral 243. The sleeve or tubular portion 242 of the valve device is formed with suitable openings to receive a shaft 245 on which is fixed a valve closure 246 of the butterfly type. The valve 246 is so formed as to close the passage through the tubular member 242 in the same manner as the valve 95 shown in Figure 5 and described above. The valve 246 may also be of the type shown in the prior Patent No. 1,745,622, issued February 4, 1930. This valve, it will be noted, controls the entire flow of the cooling medium since the flange portion 241 of the tubular member 242 is continuous.

A thermal element 250 is operatively connected with the valve 246 and is of the metallic type, as distinguished from the liquid type of thermal element referred to above. The thermal element 250 comprises a coil 251 of thermostatic metal and is anchored at one end to a transverse shaft 252 and is connected at its other end by a link 253 with the valve 246. Any other form of pivotal connection between the thermostatic element 250 and the valve 246 may be employed if desired.

As will be apparent, the coil 251 is subjected to the temperature of the water in the upper portion of the water jacket and will expand and contract in response to temperature changes thereof, and in doing so, the coil 251 will open and close the valve 246 to allow more or less flow of cooling medium from the water jacket outlet 230 to the radiator.

In controlling the position of the valve 246, the thermostatic coil 251 reacts against the shaft 252. As best shown in Figure 11, one end of the shaft 252 is journaled as at 256 in a blind opening formed in the head 237 while the other end of the shaft extends through a packing 257 into an auxiliary chamber 258 secured to or forming a part of the spacer casting 237. The auxiliary chamber 258 is closed off from communication with the interior of the spacer casting 237 and contains certain operative means for shifting the shaft 252 and thereby changing the position of the thermostatic element 250 to augment the control of the valve 246.

The outer end of the shaft 252 carries an arm 260 having a hub 261 which includes a flattened section 262 which cooperates with the corresponding portion of the outer end of the shaft 252 to mount the arm 260 in the proper relative position thereon. Means, such as a pin or set screw 264, may be used to secure the arm 260 on the shaft 252. The outer portion of the arm 260 is bifurcated to dispose portions thereof on opposite sides of a longitudinally disposed adjusting rod 270, one end of which extends through an opening 271 in the auxiliary chamber 258 and is provided with a knurled head or thumb piece 273 securely fixed to the outer end of the rod 270.

At the end of the auxiliary casing 258 opposite the knurled head 273, the casing is provided with an opening 275 which is adapted to be closed by a cap 276 carrying a bellows 278 or the equivalent. The bellows 278 is securely fastened to the cap 276 in leak-tight relation, and the interior of the bellows communicates through a tube 279 with a container or bomb 281 which is disposed in thermal relation with the cooling fluid coming from the bottom of the radiator. In practice, the tube 279 and the container 281 may be disposed in the same or similar manner as the tube 123 and container 98 in Figures 3 and 6 or the tube 172 and container 171 in Figure 8, as described above.

The other end of the bellows 278 is closed by means of a cap 286 which includes a sleeve portion 287 closed at its inner end. As in the construction shown in Figure 4, the cap is provided with threads to receive the threaded inner end 290 of the adjusting rod 270. The inner end of the sleeve 287 is adapted to seat against the cap 276 to limit the contraction of the bellows 278.

The threaded end of the adjusting rod 290 receives a pair of jam nuts 292 against which the bifurcated portion of the arm 260 bears, the arm being urged against the nuts 292 by means of a spring 294 biased between one end wall of the chamber 258 and the arm 260. To provide a rocker bearing between the bifurcated end of the arm 260 and the adjacent jam nut 292, the arm 260 carries rounded projections 295. The casing 258 has a large opening 296 in one side to provide for the installation and assembly of the parts within the casing, and the opening 296 is closed by a plate 297 held in place by screws 298.

The bellows 278, the tube 279 and the containers 281 are adapted to be completely filled with thermostatic liquid 299, and since the spring 294 biases the arm 260 and the adjusting rod 270 for movement toward the right as viewed in Figure 10, it will be seen that the volume of the confined liquid determines the position of the arm 260. It will also be observed, however, that by turning the head 273, the position of the arm 260 with respect to any given position of the cap 286 of the bellows 278 may be adjusted. A spring member 300 is secured to the casing 258 and bears against the head 273 to hold the shaft 270 in adjusted position. The spring 300 may also serve as a pointer cooperating with indicia on the head 273.

The operation of the modification just described is substantially the same as the modifications previously described. The valve 246 is, at all times, under the combined control of the thermostatic element 250 and the thermostatic unit 278-281, the thermostatic element 250 being disposed in thermal relation with the water in the upper portion of the cylinder head while the container 281 is subjected to the temperature of the water or other cooling medium flowing from the lower portion of the radiator. During the initial warming up period, as soon as the temperature of the water in the upper portion of the cylinder head around the thermostatic element 250 reaches a temperature of approximately 150° F., the coil expands sufficiently to slightly open the valve 246. As soon as this occurs, the cooling medium begins to circulate through the radiator in thermal relation with the unit 281. This unit then takes the temperature of the surrounding fluid and as the heat of the fluid is transmitted to the confined body of liquid 299 therein, the liquid begins to expand and the bellows 278 is correspondingly extended, working against the bias of the spring 295 and shifting the arm 260. As the liquid 299 is expanded in the arm 260 is swung in a clockwise direction as viewed in Figure 10 and the entire thermostatic coil unit 250 is moved to open the value 246 further. As in the modifications described previously, after this point is reached in the operation of the device, the major portion of the control is effected by the thermostatic unit 278-281, in that, if the load is increased, or if the cooling effect of the radiator varies, there will be corresponding variations in the temperature of the cooling medium coming from the radiator, and these variations will act through the lower thermostatic unit 278-281 to shift the element 250 and the valve 246 as a unit to secure the proper volume of flow under such conditions. One of the advantages of this arrangement is that, at the point where the cooling medium leaves the bottom of the radiator, there is a normal temperature range of approximately 50° F. or more, as set forth above, and a unit deriving its energy from this relatively wide range can be more satisfactorily operated than can a thermostatic unit deriving its energy from the relatively restricted temperature range of approximately 5° or 10° F. of the water jacket temperatures, as pointed out above.

For example, in the usual thermostatic control, the single thermostat arranged in the upper hose connection must necessarily draw all of its energy from the relatively small temperature change permissible at this point, whereas by performing the major portion of the control by a temperature responsive unit located at a point where the temperature changes vary over a much wider range, a more accurate and sensitive control is obtained. Similarly, the temperature of the cooling medium leaving the motor is much more likely to remain constant, or substantially so, within relatively small limits, than in prior constructions in which all of the control was effected by virtue of the temperature changes of the water coming from the cylinder jacket. Furthermore, since the relatively restricted variations of water jacket temperatures are not relied upon to effect the entire control, the thermostatic unit 250 at this point may be made shorter than formerly, and hence much more power can be secured thereby, thus making the initial opening of the valve 246 during the warming up period much more accurately controlled.

While the major control is effected, as stated above, by the thermal unit which is responsive to the temperature of the cooling medium coming from the radiator, it is true, nevertheless, that the upper thermal unit is the one which is first subjected to variations of the temperature of the cooling medium due to variations in load, but it is likewise true that the lower thermal unit is the one which is first subjected to variations of outside temperature, efficiency of the radiator, and the cooling effect of the latter on the amount of cooling medium flowing therethrough. However, consider the situation where, with other factors constant, the load on the motor is increased with the effect that the temperature of the cooling medium around the cylinder walls rises. The upper thermal unit is subjected to this temperature rise and therefore opens the control valve a proportionate amount. This increases the volume of flow to the radiator so that, for this reason alone, the temperature of the cooling medium coming from the radiator will be increased since, with a more rapid flow, a smaller amount of heat will be abstracted from the cooling medium. Furthermore, since an increase in temperature caused the upper thermal unit to open the valve in the first place, this increase in initial temperature of the cooling medium entering the radiator naturally causes an increase in temperature of the cooling medium flowing from the radiator. These two latter factors are cumulative, and therefore, the lower thermal unit, subjected to both of these factors, becomes operative to further position the valve to accommodate the rise in motor temperature and, for all practical purposes, take over the control of the valve or other means.

For reasons stated above, the lower thermal unit, being subjected to a larger range of temperature variations, is much better adapted to accurately control the valve than a thermal unit subjected to only small variations.

The construction shown in Figures 10 and 11 is illustrative of another phase of the present invention. As shown in Figure 10, the casing or chamber 258 is open to the atmosphere, through the opening 271, and is sealed off from the interior water space of the casting 237, but it is also possible to have the chamber 258 in communication with the interior of the spacer casting 237 by the use of appropriate packing for the adjusting shaft 270, and in this event the bellows 278 and the contained thermostatic liquid becomes, in and of itself, a temperature responsive unit which expands and contracts according to the temperature of the water or other cooling medium coming from the motor. This unit could then be used to replace the thermostatic member 250 in that the latter could then be a simple connecting arm without thermostatic characteristics.

In this connection, it is to be understood, of course, that the volumetric capacities of the various bellows operators and bombs or containers for the confined thermostatic liquid may be adjusted to secure the desired range of movement in accordance with the controlling range of temperature changes available.

It will at once be apparent that the invention may take many different forms other than those shown in the drawings and described above by way of illustration only. There is preferably embodied an invention in the cooling system for automobile motors, but the present invention contemplates employing the same principles in other and perhaps widely different situations, the only essential being that there is a fluid conduit system with which is associated a heating means and a cooling means, and a control for adjusting any of them for governing the temperature of the fluid flowing through the system, or for governing any other mechanism dependent upon temperature characteristics.

What is claimed, therefore, and desired to be secured by Letters Patent is:

1. In a system embodying a motor, interconnected fluid flow conduit means having at least a portion extending in thermal relation with said motor, and means normally operative to vary the temperature of at least a portion of the fluid flowing through said conduit means and including shiftable means, the method of controlling the operation of said temperature varying means which comprises shifting said shiftable means in response to simultaneous functions of the temperatures at two spaced apart points in said conduit means.

2. In a system embodying heating means, cooling means, conduit means adapted to conduct fluid in thermal relation with both the heating means and the cooling means, and means including shiftable means for varying the flow through said conduit means, the method of controlling said shiftable means which comprises initially positioning the same in substantial accordance with the temperature of the heating means, and thereafter positioning said shiftable means in substantial accordance with the temperature of the fluid leaving the cooling means.

3. In a system embodying a motor and a radiator, conduit means adapted to conduct cooling fluid in thermal relation to both said motor and radiator, the method of controlling the flow through said conduit means which comprises adjusting the flow of said cooling fluid in response to the simultaneous effects of the temperature of the cooling fluid leaving the motor and the temperature of the cooling fluid leaving the radiator.

4. In a system embodying heating means, cooling means, conduit means adapted to conduct fluid in thermal relation with both the heating means and the cooling means, and means including shiftable means for varying the effectiveness of the cooling means, the method of controlling said shiftable means which comprises initially positioning the same in substantial accordance with the temperature of the heating means, and thereafter positioning said shiftable means in substantial accordance with the combined effects of the temperature of the fluid leaving the heating means and the temperature of the fluid leaving the cooling means.

5. In a system embodying a motor, cooling means, conduit means adapted to conduct fluid in thermal relation with both the motor and the cooling means, and means including shiftable means for varying the rate of heat exchange between said fluid and said cooling means, the method of controlling said shiftable means which comprises initially positioning the same in substantial accordance with the temperature of the motor, then positioning said shiftable means in substantial accordance with the temperature of the fluid leaving the cooling means and thereafter positioning said shiftable means in substantial accordance with the combined effects of the temperature of the fluid leaving the motor and the temperature of the fluid leaving the cooling means.

6. In a system embodying a motor, cooling means, and conduit means adapted to conduct fluid in thermal relation to both said motor and cooling means, the method of controlling the flow through said conduit means which comprises initially preventing the flow of fluid through the cooling means until the temperature of the fluid leaving the motor has reached a certain point, then adjusting the flow through the cooling means in substantial accordance with the temperature of the fluid leaving the cooling means as long as the temperature of the fluid leaving the motor is substantially constant near said point, and thereafter adjusting the flow in substantial accordance with the combined effects of the temperature of the fluid leaving the motor and the temperature of the fluid leaving the cooling means.

7. A control system for internal combustion engines having a cooling system with a heat transfer medium and comprising shiftable means associated with the cooling system and serving to vary the rate of heat exchange therein, two separate units individually substantially directly responsive to the temperature of and each substantially surrounded by the heat transfer medium of said cooling system, and means placing said shiftable means under the simultaneous control of said separate units.

8. In a system including a motor, a radiator, a conduit for a cooling medium leading from the radiator to the motor and a by-pass conduit shunting said radiator, valve means adapted in one position to close off said first conduit and in another position to close off said by-pass conduit, and control means including parts disposed at all times in a position in thermal contact with the cooling medium flowing from the motor and from the radiator and automatically positioning the valve means in response to the temperature of the cooling medium in the motor and to the temperature of the cooling medium in said first conduit leading from the radiator.

9. A control system for internal combustion engines having a cooling system with a heat transfer medium circulating therethrough, said control system comprising the combination of a shiftable member associated with the cooling system and serving to vary the rate of heat exchange between the latter and the heat transfer medium circulating therethrough, an expansible bellows connected to shift said member, a chamber having substantially rigid walls and disposed in thermal relation with one portion of said cooling system, a second chamber disposed in another and thermally separated portion of the cooling system, conduit means interconnecting said expansible bellows and said chambers, and an expansible fluid disposed in said conduit means, bellows and chambers.

10. A control system for an internal combustion engine having a cooling system including a fluid conduit and means for circulating a cooling medium therethrough, said control system comprising a valve disposed in said conduit and pivoted therein for movement about an off-center axis with the valve arranged to close by the pressure of said circulating means when in operation above idling speeds, means responsive to a temperature rise of said cooling medium for opening said pivoted valve against the pressure of said circulating means, and biasing means for automatically opening said valve when said circulating means drops to idling speeds.

11. A control system for internal combustion engines having cooling means embodying a fluid conduit disposed in thermal relation with said engine and a radiator for said conduit to reduce the temperature of the fluid flowing through said conduit, said control system comprising valve means disposed in the upper part of the cooling system and adapted to control the flow from the engine to the radiator, temperature responsive means disposed in the upper part of the cooling system and responsive to the temperature of fluid from the engine, a second temperature responsive means disposed in the lower part of the cooling system and responsive to the temperature of the cooling fluid from the radiator, and means placing said valve means under the combined control of both of said two temperature responsive means.

12. A temperature responsive control system comprising a movable valve, a temperature responsive element having one end connected with the valve to move the same in response to temperature changes, an adjustable abutment mechanically connected with the other end of said element, and means including a second temperature responsive element connected with said abutment for shifting said other end of the first temperature responsive element.

13. A control system for internal combustion engines having cooling means embodying a fluid conduit disposed in thermal relation with said engine and a radiator for said conduit to reduce the temperature of the fluid flowing through said conduit, said control system comprising a by-pass conduit operatively associated with said fluid conduit and arranged to shunt said radiator, valve means operative to control the amount of fluid flow through said by-pass and said radiator, a thermally sensitive unit responsive to the temperature of the cooling fluid emerging from the radiator, a second thermally sensitive unit responsive to the temperature of the cooling fluid leaving the engine, and means placing the valve means under the combined control of said two thermally sensitive units.

14. A control system for internal combustion engines having cooling means embodying a fluid conduit disposed in thermal relation with said engine and a radiator for said conduit to reduce the temperature of the fluid flowing therethrough, said control system comprising a by-pass conduit operatively associated with said fluid conduit and arranged to shunt said radiator, a valve member movable from a position closing off flow through the radiator to a position closing off flow through said by-pass, said valve member being thereby operative to control both the fluid flow through the radiator and the fluid flow through the by-pass, temperature responsive means placing said valve member under the control of the temperature of the cooling fluid as it leaves the engine, and temperature responsive means placing said valve under the control of the temperature of the cooling fluid as it emerges from the radiator.

15. A control system for internal combustion engines having cooling means embodying a fluid conduit disposed in thermal relation with said engine and a radiator for said conduit to reduce the temperature of the fluid flowing through said conduit, said control system comprising a by-pass conduit operatively associated with said fluid conduit and arranged to shunt said radiator, valve means operative to control the amount of fluid flow through said by-pass, valve means movable independently of said first valve means for governing the amount of fluid flow through said radiator, and separate temperature responsive means placing both of the valve means under the respective control of the temperature of the cooling fluid emerging from the radiator and the temperature of the cooling fluid emerging from the by-pass.

16. A control system for internal combustion engines having a cooling system comprising a radiator and a shiftable member associated therewith and serving to vary the effectiveness of the radiator, two separate units individually and independently responsive to the temperature at thermally spaced points in said cooling system, and means placing said shiftable member under the simultaneous control of said separate units.

17. A control system for internal combustion engines having cooling means embodying a fluid conduit disposed in thermal relation with said engine and a radiator for said conduit to reduce the temperature of the fluid flowing through said conduit, said control system comprising valve means disposed in the upper part of the cooling system and adapted to control the flow from the engine to the radiator, a thermostatic element connected with said valve means, a movable member connected with said element, and temperature responsive means connected with said movable member and responsive to the temperature of the cooling means coming from the bottom of the radiator for shifting said member to adjust said valve means.

18. A control system for internal combustion engines having cooling means embodying a fluid conduit disposed in thermal relation with said engine and a radiator for said conduit to reduce the temperature of the fluid flowing through said conduit, said control system comprising valve means disposed in the upper part of the cooling system and adapted to control the flow from the engine to the radiator, a casing in which said valve means is movably supported, a shaft journaled in said casing, a thermostatic coil anchored at one end to said shaft and connected at its other end to shift said valve means, an auxiliary chamber carried by said casing, one end of said shaft extending into said chamber, an arm on said end of the shaft, a bellows carried with said chamber and having one end movable and adjustably connected with said arm, a container having rigid walls disposed in thermal relation with the cooling means coming from said radiator, a conduit connecting said bellows and container, and an expansible fluid filling said bellows, conduit and container.

19. A control system for an internal combustion engine having a cooling system including a fluid conduit and means for circulating a cooling medium therethrough, said control system comprising a movably mounted valve arranged to automatically close by the pressure of said circulating means when in operation above idling speeds, means responsive to a temperature rise of said cooling medium for opening said valve against the pressure of said circulating means, and biasing means for automatically opening said valve when said circulating means drops to idling speeds.

20. A temperature responsive control system for an internal combustion engine having a cooling system including a fluid conduit and means for circulating a cooling medium therethrough, said control system comprising a movable valve controlling the circulation of said medium through said system, temperature responsive means disposed on the interior of said fluid conduit in thermal relation with said circulating medium and connected with the valve to move the same in response to temperature changes, means serving as an adjustable element taking the reaction of said temperature responsive means in moving said valve, and means including a second temperature responsive means also disposed on the interior of said fluid conduit at a point spaced from said first temperature responsive means and operatively connected with said abutment means for adjusting the position thereof.

21. A control system for internal combustion engines having cooling means embodying a fluid conduit disposed in thermal relation with said engine, a radiator for said conduit to reduce the temperature of the fluid flowing therethrough and a pump for circulating the cooling fluid, said control system comprising a by-pass conduit operatively associated with said fluid conduit and arranged to return the fluid to the pump without forcing it through said radiator, valve means operative to control the fluid flow through the by-pass, separate valve means operative to control the flow from the radiator to said engine, temperature responsive means placing said first mentioned valve means under the control of the temperature of the cooling fluid as it emerges from said by-pass, auxiliary valve means providing for a limited flow of fluid from the radiator to the engine when said first mentioned valve means controlling the by-pass moves toward its closed position, and temperature responsive means disposed in a position to be thermally responsive to said limited flow of fluid from the radiator and placing said second mentioned valve means under the control of the temperature of the cooling fluid as it emerges from the radiator.

22. A control system for internal combustion engines having cooling means embodying a fluid conduit disposed in thermal relation with said engine and a radiator for said conduit to reduce the temperature of the fluid flowing through said conduit, said control system comprising valve means adapted to control the flow from the engine to the radiator, temperature responsive means responsive to the temperature of fluid from the engine and connected to shift said valve, a second temperature responsive means responsive to the temperature of the cooling fluid coming from the radiator, and means connecting said second temperature responsive means with said first temperature responsive means whereby the second temperature responsive means controls both the first temperature responsive means and the valve connected therewith.

23. A control system for internal combustion engines having cooling means embodying a fluid conduit disposed in thermal relation with said engine and a radiator for said conduit to reduce the temperature of the fluid flowing through said conduit, said control system comprising valve means adapted to control the flow from the engine to the radiator, temperature responsive means responsive to the temperature of fluid from the engine and connected to shift said valve, a second temperature responsive means responsive to the temperature of the cooling fluid coming from the radiator, means connecting said second temperature responsive means with said first temperature responsive means whereby the second temperature responsive means controls both the first temperature responsive means and the valve connected therewith, and manual means for adjusting the relation between the first and second temperature responsive means.

24. A temperature responsive control system comprising a movable valve, temperature responsive means connected with the valve to move the same in response to temperature changes, means serving as an adjustable abutment against which said temperature responsive means acts in shifting said movable valve, an expansible member for shifting said abutment, and temperature responsive means including a confined fluid controlling the position of said expansible member.

25. A control system for internal combustion engines having a radiator and conduit means leading from the engine to said radiator, said control system comprising a member supported in said conduit means, valve means movably carried by said member and operative to control the flow of cooling fluid through the radiator, temperature responsive means carried by said member within said conduit means and operatively connected at one end with said valve means, abutment means connected with the other end of said temperature responsive means and extending to a point outside said conduit means, means responsive to the temperature of the cooling fluid flowing out of the radiator, and means operatively connecting said last named temperature responsive means with said abutment means outside said conduit means.

26. A control system for internal combustion engines having cooling means embodying a fluid conduit disposed in thermal relation with said engine, a radiator for said conduit to reduce the temperature of the fluid flowing therethrough, and a pump for circulating the cooling fluid, said control system comprising a by-pass conduit operatively associated with said fluid conduit and arranged to return the fluid to the pump without forcing it through said radiator, valve means operative to control both the fluid flow through the radiator and the fluid flow through the by-pass, and temperature responsive means operatively connected with said valve means and including one temperature responsive section positioned so as to be surrounded by and exposed to the temperature of the cooling fluid coming from the radiator and another section spaced from the first temperature responsive section and responsive to the temperature of the fluid which flows through the by-pass without having passed through the radiator.

27. A control system for an internal combustion engine having a cooling system including a fluid conduit and means for circulating a cooling medium therethrough, said control system comprising a movably mounted valve arranged to move toward closed position when said circulating means is in operation above idling speeds, means responsive to a temperature rise of said cooling medium for opening said valve, and biasing means for automatically opening said valve when said circulating means drops to idling speeds regardless of the temperature of said cooling medium.

28. A control system for internal combustion engines having cooling means embodying a fluid conduit disposed in thermal relation with said engine, means for circulating a cooling medium through said conduit, and a radiator for said conduit to reduce the temperature of the fluid flowing through said conduit, said control system comprising a by-pass conduit operatively associated with said fluid conduit and arranged to shunt said radiator, valve means operative to control the amount of fluid flow through said by-pass, valve means separate therefrom for controlling the flow through said fluid conduit and arranged to move toward closed position when said circulating means is in operation above idling speeds, means responsive to a temperature rise of said cooling medium for opening said last named valve means, and automatic means for opening said last named valve means, irrespective of the temperature of said cooling medium, when said circulating means drops to idling speeds.

29. A control system for internal combustion engines having cooling means embodying a fluid conduit disposed in thermal relation with said engine, means for circulating a cooling medium through said conduit, and a radiator for said conduit to reduce the temperature of the fluid flowing through said conduit, said control system comprising a by-pass conduit operatively associated with said fluid conduit and arranged to return the cooling medium to the circulating means without being forced through said radiator, valve means operative to control the amount of fluid flow through said by-pass and through said fluid conduit, said valve means including a part arranged to move toward closed position when said circulating means is in operation above idling speeds, means biasing said part for movement to an open position to establish thermosyphon cooling when said circulating means drops to idling speeds and below, and means responsive to a rise in temperature of the cooling medium coming from the radiator for positively opening said valve part.

30. A control system for an internal combustion engine having a cooling system including a fluid conduit and means for circulating a cooling medium therethrough, said control system comprising a valve disposed in said conduit and arranged to close by the pressure of said circulating means when in operation above idling speeds, means responsive to a temperature rise of said cooling medium for opening said valve against the pressure of said circulating means, and biasing means for automatically opening said valve when said circulating means drops to idling speeds.

31. A control system for internal combustion engines having cooling means embodying a fluid conduit disposed in thermal relation with said engine and a radiator for said conduit to reduce the temperature of the fluid flowing through said conduit, said control system comprising valve means adapted to control the flow from the engine to the radiator, temperature responsive means disposed in the upper part of the cooling system and responsive to the temperature of fluid from the engine, a second temperature responsive means disposed in the lower part of the cooling system and responsive to the temperature of the cooling fluid from the radiator, and means placing said valve means under the combined control of both of said two temperature responsive means.

32. A control system for internal combustion engines having a cooling system comprising a radiator and a shiftable member associated therewith and serving to vary the effectiveness of the radiator, two separate units individually and independently responsive to the temperature at thermally spaced points in said cooling system, one of said units comprising a rigid walled container disposed on the interior of said cooling system and substantially entirely surrounded by the cooling medium therein adjacent the upper part of the engine and the other unit also comprising a rigid walled container disposed adjacent the lower portion of the engine and disposed on the interior of said cooling system and substantially entirely surrounded by said cooling medium, and means placing said shiftable member under the simultaneous control of said separate units.

33. A control system for internal combustion engines having cooling means embodying a fluid conduit disposed in thermal relation with said engine and a radiator for said conduit to reduce the temperature of the fluid flowing through said conduit, said control system comprising valve means adapted to control the flow from the engine to the radiator, a thermostatic element connected with said valve means and responsive to the temperature of the cooling means coming from said engine, a movable member connected with said element at a point opposite its connection with said valve means, and temperature responsive means connected with said movable member and responsive to the temperature of the cooling means coming from the bottom of the radiator for shifting said member to adjust said valve means.

34. A control system for internal combustion engines having cooling means embodying a fluid conduit disposed in thermal relation with said engine and a radiator for said conduit to reduce the temperature of the fluid flowing through said conduit, said control system comprising valve means disposed in the upper part of the cooling system and adapted to control the flow from the engine to the radiator, a casing in which said valve means is movably supported, a shaft journaled in said casing, a thermostatic coil anchored at one end to said shaft and connected at its other end to shift said valve means, an arm on said shaft, and temperature responsive means responsive to the temperature of the cooling means coming from the bottom of the radiator and connected with said arm for adjusting the position of the anchored end of said thermostatic coil.

35. A control system for internal combustion engines having cooling means embodying a fluid conduit disposed in thermal relation with said engine and a radiator for said conduit to reduce the temperature of the fluid flowing through said conduit,, said control system comprising valve means disposed in the upper part of the cooling system and adapted to control the flow from the engine to the radiator, said fluid conduit including a casing in which said valve means is movably supported, a shaft journaled in said casing, means operatively connecting said valve means and said shaft so that movement of the latter changes the position of the valve means, means including an expansible bellows disposed adjacent the upper part of the cooling system and operatively connected with said shaft to change the position of the latter, a container having rigid walls disposed in thermal relation with the cooling means coming from said radiator, a conduit connecting said bellows and container, and an expansible fluid filling said bellows, conduit and container.

36. A control system for internal combustion engines having cooling means embodying a fluid conduit disposed in thermal relation with said engine, a radiator for said conduit to reduce the temperature of the fluid flowing therethrough, a connection from the lower part of the radiator to said engine, said control system comprising movably mounted valve means disposed in said connection, and an expansible bellows operatively connected with said valve means and disposed on the interior of said connection on the radiator side of said valve means so as to be subjected to the temperature of the cooling fluid flowing from the radiator at all times, both when the valve means is open and when the same is closed, and temperature responsive means spaced from said bellows and operatively connected with said movable valve means to position the latter in response to heated fluid from the engine.

37. A control system for internal combustion engines having cooling means embodying a fluid conduit disposed in thermal relation with said engine, a radiator for said conduit to reduce the temperature of the fluid flowing therethrough, and a connection from the lower portion of the radiator to the engine, said control system comprising a conduit section disposed in said last named connection, a valve of the butterfly type pivotally mounted in said conduit section and adapted to control the flow of cooling medium therethrough, and an expansible bellows disposed on the interior of said conduit section on the radiator side of said valve, and in thermal relation with respect to the cooling means coming from the radiator, both when the valve is opened and when the same is closed, the axis of movement of said expansible bellows lying substantially at right angles to said pivoted valve when the latter is in its closed position.

38. A control system for internal combustion engines having cooling means embodying a fluid conduit disposed in thermal relation with said engine, a radiator for said conduit to reduce the temperature of the fluid flowing therethrough, a connection from the lower part of the radiator to said engine, said control system comprising movably mounted valve means disposed in said connection, an expansible bellows disposed on the interior of said connection on the radiator side of said valve means so as to be subjected to the temperature of the cooling fluid flowing from the radiator at all times, both when the valve means is open and when the same is closed, means operatively connecting said expansible bellows with said movable valve means, and a container disposed in thermal relation with the cooling fluid coming from the upper part of the engine and operatively connected with said expansible bellows so as to place said valve means under the control of the temperatures at spaced points in said cooling means.

39. A control system for internal combustion engines having cooling means embodying a fluid conduit disposed in thermal relation with said engine, a radiator for said conduit to reduce the temperature of the fluid flowing therethrough, said fluid conduit including a radiator connection from the lower part of the radiator to the engine and a conduit section disposed in said connection, and a pump for circulating the cooling fluid, said control system comprising a valve pivotally mounted in said conduit section and biased for movement toward closed position, said valve being biased for movement to a closed position when said pump is in operation above idling speeds, and a temperature responsive unit disposed in said conduit section on the radiator side of said valve and exposed to the temperature of the cooling fluid coming from the radiator and operative to shift said valve toward open position.

40. A control system for internal combustion engines having cooling means embodying a fluid conduit disposed in thermal relation with said engine, a radiator for said conduit to reduce the temperature of the fluid flowing therethrough, a connection from the lower part of the radiator to said engine, said control system comprising movably mounted valve means disposed in said connection, and an expansible bellows disposed on the interior of said connection on the radiator side of said valve means so as to be subjected to the temperature of the cooling fluid flowing from the radiator at all times, both when the valve means is open and when the same is closed, means operatively connecting said expansible bellows with said movable valve means, means providing for a by-pass flow of cooling fluid from the radiator through said connection and around said valve, valve means controlling the flow through said by-pass means, and means including a second expansible bellows controlling said valve means and subjected to the temperature of the cooling fluid coming from the engine.

41. In a system embodying a motor, interconnected fluid flow conduit means having at least a portion extending in thermal relation with said motor and a radiator, means normally operative to vary the rate of heat exchange between said radiator and the fluid flowing through the radiator and including shiftable means, two thermally responsive units disposed in said cooling fluid at spaced-apart points in the flow thereof, one of said units being totally immersed in the fluid leaving the motor and the other being totally immersed in the fluid leaving the radiator, so as to be responsive, respectively, to the temperature of said fluid at said points, means connecting said units to said shiftable means so as to control the latter in direct proportion to the simultaneous effect of the temperature of the cooling fluid leaving the motor and the temperature of the cooling fluid leaving the radiator at the same time.

42. In a system embodying a motor and a radiator, conduit means adapted to conduct cooling fluid in thermal relation to both said motor and radiator, valve means controlling the flow through said conduit means, two thermally responsive units disposed in said cooling fluid at spaced-apart points in the flow thereof, one of said units being totally immersed in the fluid leaving the motor and the other being totally immersed in the fluid on the radiator side of said valve means so as to be responsive, respectively, to the temperature of said fluid at said points, and means connecting said units with said valve means so as to govern the position thereof and adjust the flow of said cooling fluid in response to the cumulative effect of the temperature of the cooling fluid leaving the motor and the temperature of the cooling fluid leaving the radiator, at the same time.

43. In a system embodying a motor and a radiator, conduit means adapted to conduct cooling fluid in thermal relation to both said motor and radiator, valve means controlling the flow through said conduit means, two thermally responsive units disposed in said cooling fluid at spaced-apart points in the flow thereof, one of said units being responsive to the temperature of the fluid leaving the motor and the second unit, including a rigid walled container, being totally immersed in and responsive to the temperature of the fluid leaving the radiator, and means connecting both of said units with said valve means.

44. In a system embodying a motor, interconnected fluid flow conduit means having at least a portion extending in thermal relation with said motor, means normally operative to vary the temperature of at least a portion of the fluid flowing through said conduit means and including shiftable means, a first thermally responsive unit disposed in said conduit means in a position to be responsive to the temperature of the fluid leaving said motor, a second thermally responsive unit disposed in said conduit means in spaced relation with respect to said first unit and including a rigid walled fluid filled container totally immersed in the fluid flowing toward said motor, an expansible and contractible member connected with said container so as to be movable in response to temperature changes in the fluid in said rigid walled container, means connecting said member with said shiftable means, and means also connecting said first thermally responsive unit with said shiftable means so as to put the latter under the simultaneous control of both of said units.

45. A temperature responsive control system for an internal combustion engine having a cooling system including a fluid conduit and means for circulating a cooling medium therethrough, said control system comprising a movable valve controlling the circulation of said medium through said system, temperature responsive means disposed on the interior of said fluid conduit in thermal relation with said circulating medium and connected with the valve to move the same in response to temperature changes, adjusting means for said temperature responsive means comprising an expansible and contractible bellows operatively connected therewith and serving as an adjustable element taking the reaction of said temperature responsive means in moving said valve, and means for varying the position of said bellows.

46. A temperature responsive control system for an internal combustion engine having a cooling system including a fluid conduit and means for circulating a cooling medium therethrough, said control system comprising a movable valve controlling the circulation of said medium through said system, temperature responsive means disposed on the interior of said fluid conduit in thermal relation with said circulating medium and connected at one end with the valve to move the same in response to temperature changes, adjusting means for said temperature responsive means comprising an expansible and contractible bellows operatively connected with the other end of said temperature responsive means and serving as an adjustable element taking the reaction of said temperature responsive means in moving said valve, and manually adjustable means for varying the reaction of said expansible and contractible bellows on said temperature responsive means.

47. A temperature responsive control system for an internal combustion engine having a cooling system including a fluid conduit and means for circulating a cooling medium therethrough, said control system comprising a movable valve controlling the circulation of said medium through said system, a liquid container disposed on the interior of said fluid conduit in thermal relation with said circulating medium and including an expansible and contractible bellows connected with the valve to move the same in response to temperature changes, adjusting means for said temperature responsive means comprising a second bellows having its interior communicating with the interior of said first bellows, expansible fluid filling said two bellows, said second bellows serving as an adjustable element taking the reaction of said fluid in causing said first bellows to move said valve, and means for varying the position of said second bellows.

CLARENCE H. JORGENSEN.
CLARENCE H. JORGENSEN,
*As Administrator of the Estate of Peter J. Jorgensen, Deceased.*